(12) United States Patent
Atkin et al.

(10) Patent No.: US 7,272,228 B2
(45) Date of Patent: Sep. 18, 2007

(54) SYSTEM AND METHOD FOR SECURING CODE AND ENSURING PROPER EXECUTION USING STATE-BASED ENCRYPTION

(75) Inventors: Steven Edward Atkin, Austin, TX (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 10/460,461

(22) Filed: Jun. 12, 2003

(65) Prior Publication Data
US 2005/0005103 A1 Jan. 6, 2005

(51) Int. Cl.
*H04L 9/00* (2006.01)
(52) U.S. Cl. .................. 380/264; 713/165; 713/190; 713/193; 380/44
(58) Field of Classification Search ............. 713/165, 713/189, 193, 190; 380/264
See application file for complete search history.

(56) References Cited

U.S. PATENT DOCUMENTS

| | | | |
|---|---|---|---|
| 4,251,885 A | 2/1981 | Dodt et al. ............ 371/60 |
| 4,433,207 A | 2/1984 | Best .................. 178/22.09 |
| 4,930,073 A | 5/1990 | Cina, Jr. .............. 364/300 |
| 5,689,243 A | 11/1997 | Bianco ............... 340/825.3 |
| 5,757,915 A | 5/1998 | Aucsmith et al. ........ 380/25 |
| 5,917,908 A * | 6/1999 | Takenaka et al. ....... 713/190 |
| 6,092,147 A | 7/2000 | Levy et al. ............. 711/6 |
| 6,286,098 B1 | 9/2001 | Wenig et al. ............ 713/151 |
| 6,289,451 B1 | 9/2001 | Dice ................... 713/168 |
| 6,314,521 B1 | 11/2001 | Debry .................. 713/201 |
| 6,378,072 B1 | 4/2002 | Collins et al. ........... 713/187 |
| 6,425,118 B1 | 7/2002 | Molloy et al. ............ 717/4 |
| 6,463,151 B1 | 10/2002 | Iitsuka et al. ........... 380/201 |
| 6,480,959 B1 | 11/2002 | Granger et al. .......... 713/189 |
| 6,490,720 B1 | 12/2002 | Carlsen et al. .......... 717/127 |
| 2004/0039926 A1 * | 2/2004 | Lambert ................ 713/189 |

FOREIGN PATENT DOCUMENTS

WO        WO 02/31648 A2 *    4/2002

OTHER PUBLICATIONS

Li Gong; Sun Microsystems; Secure Java Class Loading, IEEE, 1998, XP-002177474, pp. 56-61; Retrieved date Dec. 15, 2006.*
Jones et al., "Program Behavior Analyzer and Detector," IBM Technical Disclosure Bulletin, Mar. 1993, vol. 25, No. 10, p. 5303-5305.

* cited by examiner

Primary Examiner—Gilberto Barrón, Jr.
Assistant Examiner—Samson Lemma
(74) Attorney, Agent, or Firm—VanLeeuwen & VanLeeuwen; Mark S. Walker

(57) ABSTRACT

A system and method for securing code segments and ensuring proper execution using state-based encryption is presented. A class loader captures a memory state snapshot and uses the memory state snapshot for generating a key that encrypts a class. The class loader subsequently captures additional memory state snapshots at specific execution cycle times, and uses the memory state snapshots to generate additional keys that encrypt subsequent code segments. The encrypted code segments are stored in a file that is distributed to client computers. The client computer decrypts the individual code segments using keys that are generated from client memory state snapshots. If a particular code segment is not loaded in order or has been altered, the code segment is not decrypted properly and the software program terminates.

17 Claims, 6 Drawing Sheets

SYSTEM AND METHOD FOR SECURING CODE AND ENSURING PROPER EXECUTION USING STATE-BASED ENCRYPTION

BACKGROUND OF THE INVENTION

1. Technical Field

The present invention relates in general to a system and method for securing code and ensuring proper execution using state-based encryption. More particularly, the present invention relates to a system and method for capturing and using individual memory state snapshots for encryption purposes.

2. Description of the Related Art

The Internet and personal computers have changed the way digital content is produced and distributed. Downloading digital content has gained acceptance because it provides immediate access to desired content and a user does not need to leave his home. As markets evolve, more digital content will become available on the Internet. However, a challenge found with distributing digital content is that digital content may be illegally copied and altered if not protected correctly.

Digital Rights Management (DRM) is a set of technologies in which content owners may use to protect their digital content. DRM encrypts digital content and limits access to those users who have acquired a proper license to use the digital content. A challenge found with existing DRM solutions is that once digital content is decrypted, it is stored unencrypted in a non-volatile storage area, which is accessible, by malicious users.

A malicious user may attempt to improperly execute the unencrypted digital content. For example, a malicious user may attempt to load classes included in a Java program out of sequence in order to change the Java program's functionality. Furthermore, a malicious user may alter portions of the digital content in order to change the digital content's functionality. Using the example described above, the malicious user may alter a particular class included in the Java program in order to change the Java program's functionality.

What is needed, therefore, is a system and method for securing code such that the code is protected against improperly execution or alteration.

SUMMARY

It has been discovered that the aforementioned challenges are resolved by capturing individual memory state snapshots, generating individual keys from the memory state snapshots, using the individual keys to encrypt individual code segments, and including the individual code segments in a software program that is distributed to client computers. If the client computer alters one of the code segments or attempts to load one of the code segments out of order, the software program halts.

A vendor uses a computing device, such as a server, to compile a software program and store the software program in non-volatile memory. For example, a vendor may compile a Java software program using a "javac" command in conjunction with a Java jar command. The server starts the software program which initiates a Java Virtual Machine (JVM). The JVM waits for the software program to request to load a first code segment, such as a first class. When the request occurs, the JVM uses a modified class loader to capture a memory state snapshot of the JVM's internal memory. The modified class loader adheres to standard class loader interfaces and includes properties for encrypting and decrypting classes.

In one embodiment, the server uses the JVM's primordial class loader to load the first class and then use the first class to call the modified class loader. In turn, the modified class loader calls and encrypts subsequent classes. In this embodiment, the first class remains unencrypted and subsequent classes are encrypted.

The captured memory state snapshot represents the state of the internal memory prior to the first class being loaded. The modified class loader uses the snapshot to generate a secure hash value using standard hash algorithms, such as MD5 or SHA1. The modified class loader then uses the secure hash value to generate a first key. In one embodiment, the modified class loader uses the secure hash value as the key. In another embodiment, the modified class loader may lengthen or shorten the secure hash, such as through concatenation, which results in a suitable key length. The modified class loader encrypts the first class using the generated first key and replaces the unencrypted first class with the encrypted first class in a jar file.

The JVM restarts the software program which, in turn, resets the JVM's internal memory. When the software program restarts, the JVM receives a request to load the first class. The modified class loader captures a memory state snapshot that is identical to the memory state snapshot used to generate the first key as described above. The modified class loader generates a key identical to the first key and decrypts the encrypted first class using the generated key. After the first class is decrypted, the modified class loader executes the first class and waits for a second class load request. When the modified class loader receives a second class load request, the modified class loader captures a second memory state snapshot and proceeds to generate a second key to encrypt the second class. This sequence of events occurs until the JVM reaches a stable state (i.e. a user input is required or a breakpoint is established). Once the JVM has completed processing the classes, the jar file, which includes the encrypted classes, the modified class loader, and may include classes that were not encrypted, is distributed to client computers.

In one embodiment, classes may be encrypted after a stable state is reached. For example, after reaching a stable state, the class loader may encrypt each of the remaining classes using a memory state snapshot of the stable state.

When a client computer starts received encrypted software program, the encrypted software program initiates and produces a load request. When the load request occurs, the modified class loader included in the jar file captures a snapshot of the JVM's internal memory. The modified class loader uses the snapshot to generate a first key. The modified class loader retrieves the first encrypted class and decrypts the encrypted class using the generated first key, resulting in a decrypted first class. The modified class loader loads and executes the decrypted first class.

In one embodiment, a vendor may not have encrypted the first class to load. In this embodiment, the client computer uses the client JVM's primordial class loader to load the first class, whereby the first class calls the modified class loader to load subsequent classes.

When a second class is called, the modified class loader captures a second memory state snapshot of the client JVM's internal memory and generates a second key using the second memory state snapshot. The modified class loader continues to decrypt subsequent classes using keys generated from memory state snapshots that the modified class loader captures at particular times. If a client loads a class in the wrong order or if a class was altered, the software program halts.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
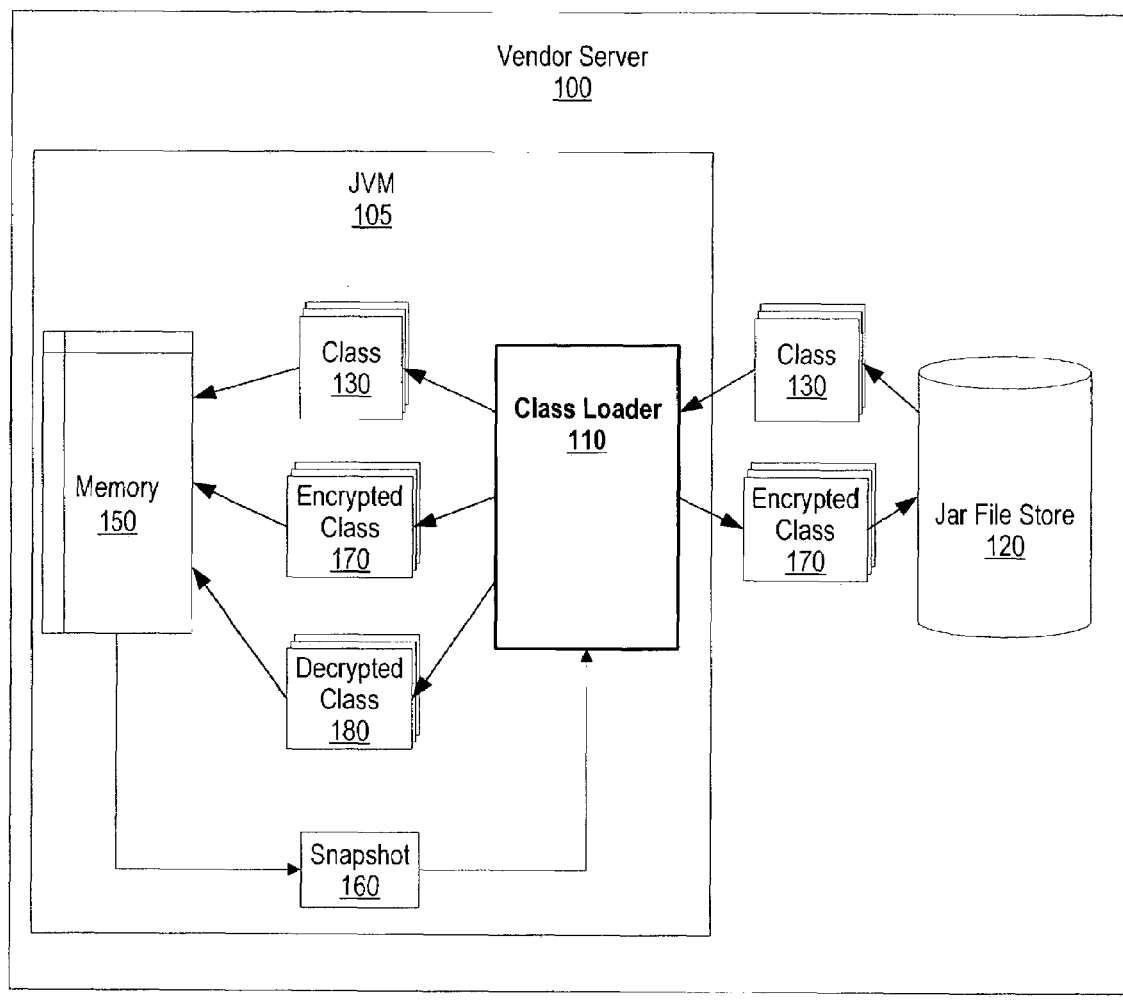
FIG. 1 is a diagram showing a vendor server individually encrypting code segments, such as classes, included in a software program.

FIG. 1 is a diagram showing a vendor server individually encrypting code segments, such as classes, included in a software program. Vendor server 100 includes Java Virtual Machine (JVM) 105 which executes the compiled software program that is located in jar file store 120. For example, a Java software program may be compiled and stored in a jar file using a "javac" command in conjunction with a Java jar command. Jar file store 120 may be stored on a non-volatile storage area, such as a computer hard drive.

When the software program starts, JVM 105 waits for the software program to request a first code segment to load, such as a class. When the request occurs, class loader 110 captures a snapshot (e.g. snapshot 160) of memory 150 which is included in JVM 105. Class loader 110 adheres to standard class loader interfaces and includes properties to encrypt and decrypt classes. As one skilled in the art can appreciate, class loader 110 may be created using standard programming mechanisms, such as Java. Snapshot 160 represents the state of memory 150 just prior to the first class being loaded (see FIG. 3 and corresponding text for further details regarding memory state snapshots). Memory 150 may be stored on a volatile storage area, such as volatile memory. Class loader 110 uses snapshot 160 to generate a secure hash value using standard hash algorithms, such as md5 or sha1. Class loader 110 then uses the secure hash value to generate a first key. In one embodiment, class loader 110 uses the secure hash as the key. In another embodiment, class loader 110 may lengthen or shorten the secure hash, such as through concatenation, which results in a suitable key length (see FIG. 4 and corresponding text for further details regarding key generation).

In one embodiment, the server uses the JVM's primordial class loader to load the first class and then use the first class to call the modified class loader. In turn, the modified class loader calls and encrypts subsequent classes. In this embodiment, the first class remains unencrypted and subsequent classes are encrypted.

Class loader 110 loads the first class, such as class 130, which, in turn, is stored in memory 150. Class loader 110 encrypts class 130 using the generated first key which results in an encrypted class (e.g. encrypted class 170). Encrypted class 170 is loaded into memory and stored in jar file store 120 and encrypted class 170's corresponding unencrypted class (e.g. class 130) is removed from jar file store 120. Jar file store 120 now includes encrypted class 170 and other non-encrypted classes that are included in the software program which have not yet been encrypted.

During software program decryption steps at a client computer, the client computer decrypts and executes the first class prior to decrypting a second class. After executing the first class, the client computer captures a second memory state snapshot for use in generating a second key to decrypt the second class (see FIG. 2 and corresponding text for further details regarding code segment decryption). Therefore, in order to encrypt the second class with a corresponding key, class loader 110 proceeds through a sequence of steps to execute the first class which places memory 150 in a condition to capture a second memory state snapshot. Class loader 110 uses the second memory state snapshot to generate a second key for use in encrypting the second class (see below for further details).

The sequence of steps begins by restarting the software program which, in turn, resets memory 150. Class loader 110 captures the first memory state snapshot and generates the first key. Class loader 110 loads encrypted class 170, which is stored in memory 150. Class loader 110 uses the generated first key to decrypt encrypted class 170, resulting in decrypted class 180. Class loader 110 loads decrypted class 180 (e.g. first class) in memory 150 and executes decrypted class 180. Memory 150 is now in a condition for capturing a second memory state snapshot for use in generating a second key to encrypt a second class. This process repeats until each class included in the software program is encrypted and stored in jar file store 120 which results in an encrypted software program (see FIG. 4 and corresponding text for further details regarding individual code segment encryption steps). Once each class is encrypted and stored, the encrypted software program is distributed to client computers.

In one embodiment, the JVM may stop encrypting classes once a stable state is reached (i.e. a user input required or a breakpoint is established). In this example, the jar file may include encrypted classes and unencrypted classes that are called after the stable state is reached.

Figure 2:
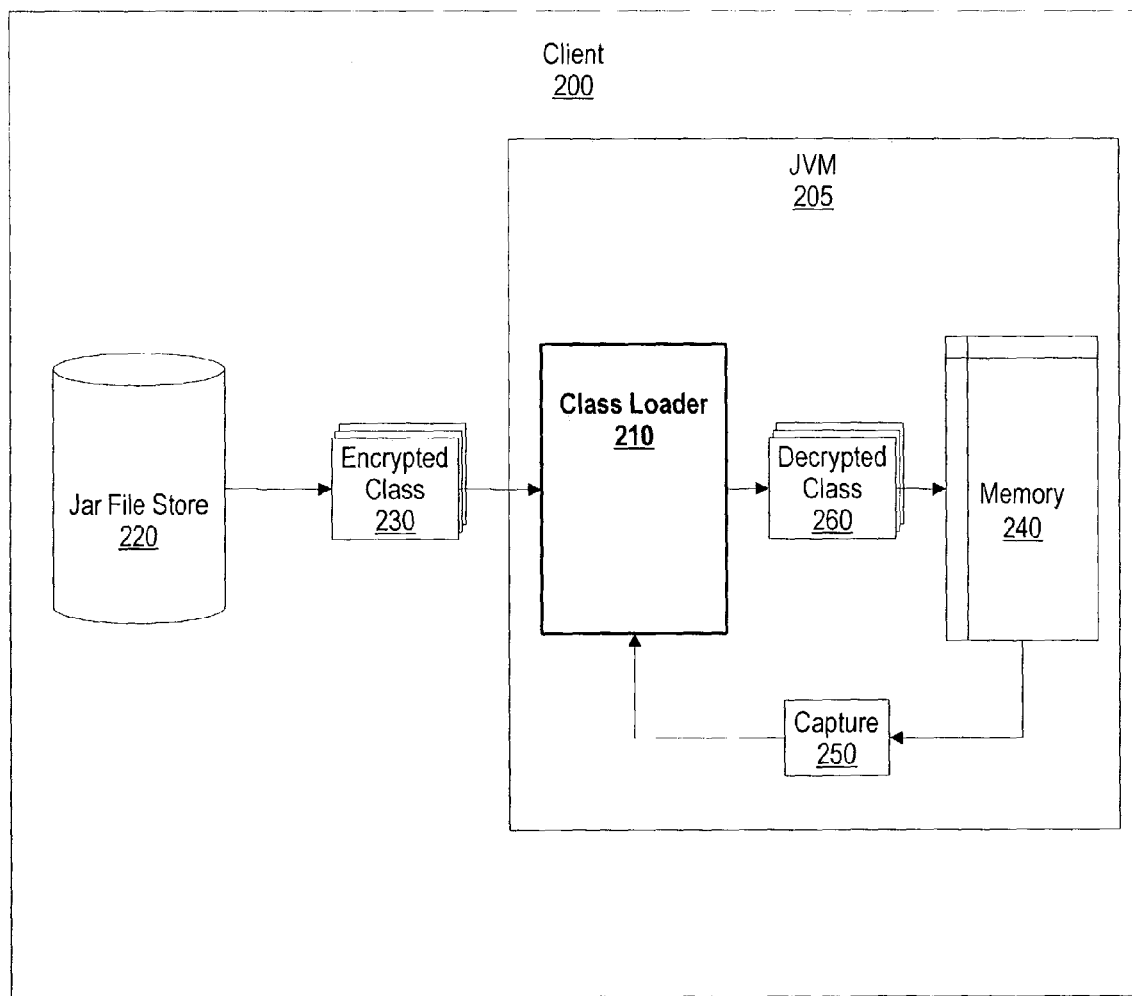
FIG. 2 is a diagram showing a client computer executing an encrypted software program by decrypting individual code segments using keys that are generated from memory state snapshots.

FIG. 2 is a diagram showing a client computer executing an encrypted software program by decrypting individual code segments using keys that are generated from memory state snapshots. Client 200 receives the encrypted software program that includes individually encrypted code segments, such as classes, along with a modified class loader (see FIGS. 1, 3, 4, and corresponding text for further details regarding code segment encryption steps). Client 200 stores the encrypted software program in jar file store 220. Jar file store 220 may be stored on a non-volatile storage area, such as a computer hard drive.

When the software program starts, Java Virtual Machine (JVM) 205 waits for the program to request a first code segment (e.g. class) to load. When the request occurs, the modified class loader (e.g. class loader 210) captures a snapshot (e.g. snapshot 250) of memory 240, wherein memory 240 is included in JVM 205. Memory 240 may be stored in a volatile storage area, such as volatile memory. Class loader 210 uses snapshot 250 to generate a first key. Class loader 210 retrieves encrypted class 230 and decrypts encrypted class 230 using the generated first key, resulting in decrypted class 260. Class loader 210 loads decrypted class 260 in memory 240, and executes decrypted class 260.

When a second class is called, class loader 210 captures a second memory state snapshot of memory 240 and generates a second key using the second memory state snapshot. Class loader 210 continues to decrypt subsequent classes using keys generated from memory state snapshots that are captured at particular times. If a class is loaded in the wrong order or if a class was altered, the software program halts (see FIG. 5 and corresponding text for further details regarding code segment decryption).

In one embodiment, a vendor may not have encrypted the first class to load. In this embodiment, the client computer uses the client JVM's primordial class loader to load the first class, whereby the first class calls the modified class loader to load subsequent classes.

Figure 3:
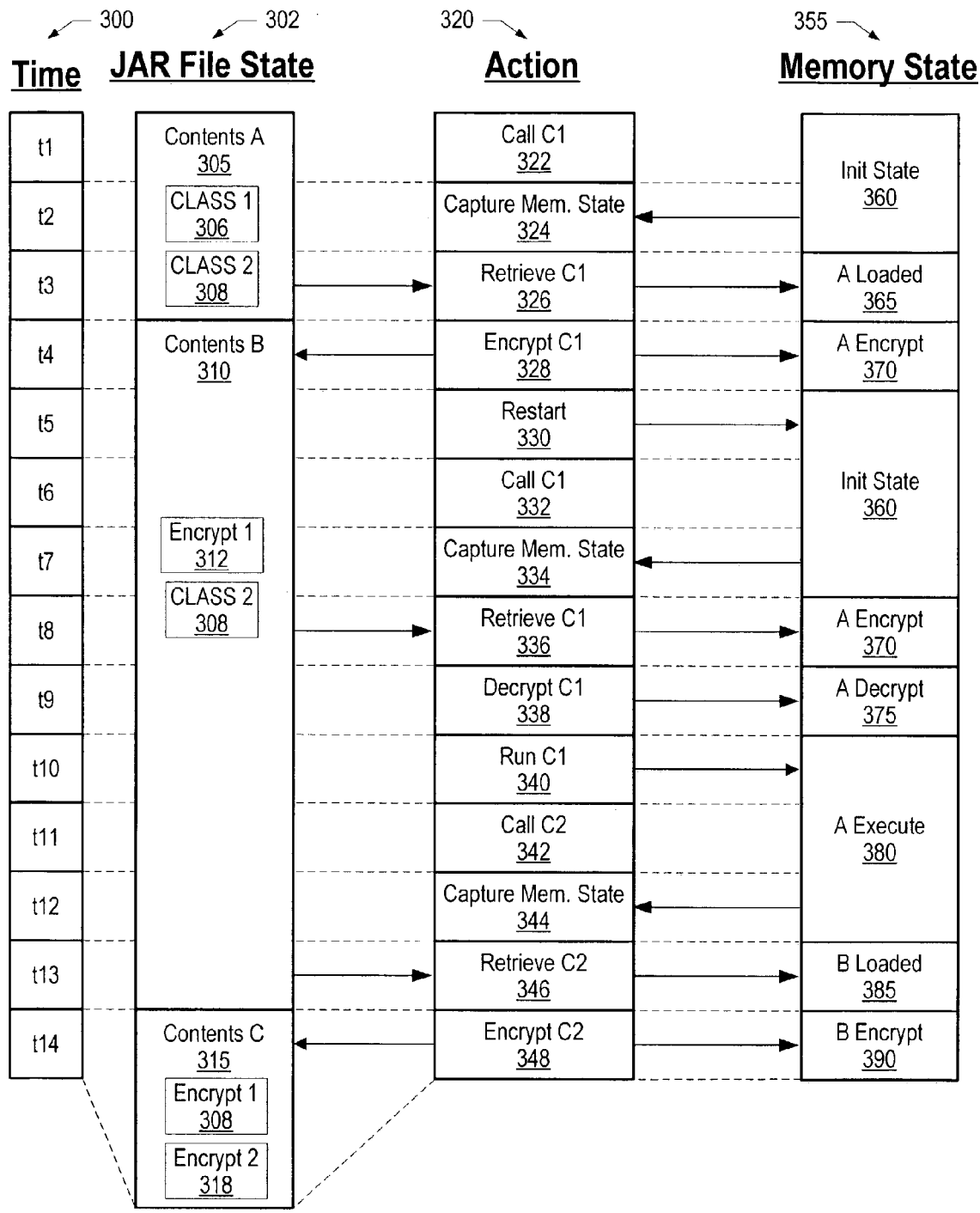
FIG. 3 is a timeline diagram showing jar file contents and memory states corresponding to particular Java Virtual Machine actions.

FIG. 3 is a timeline diagram showing jar file contents and memory states corresponding to particular Java Virtual Machine (JVM) actions. Column 300 is a timeline ranging from time t1 through time t14. Column 302 shows jar file contents corresponding to particular times. Column 320 shows various actions in which a Java Virtual Machine (JVM) partakes in order to encrypt each class included in a particular software program. Column 355 shows various memory states of the JVM while the JVM performs actions shown in column 320.

The JVM starts a software program located in a jar file and waits for the software program to call a class. The software program includes contents A 305 which includes class 1 306 and class 2 308, both of which are unencrypted. Prior to the software program calling a class, the memory state is at initialize state 360. At time t1, action 322 calls class 1 306 from the jar file. At time t2, prior to loading class 1 306 into internal memory, action 324 captures the memory state of the internal memory, which is initialize state 360. At time t3, action 326 retrieves class 1 306 and loads it into internal memory, which changes the memory state to A loaded 365. At time t4, action 328 encrypts class 1 306 using a key that is generated from the captured memory state (e.g. initialize 360)(see FIG. 4 and corresponding text for further details regarding key generation). When processing encrypts class 1 306 at time t4, the memory state changes from A loaded 365 to A encrypt 370. Processing also stores the encrypted class (e.g. encrypt 1 312) into the jar file which changes the contents of the jar file from contents A 305 to contents B 310.

Figure 5:
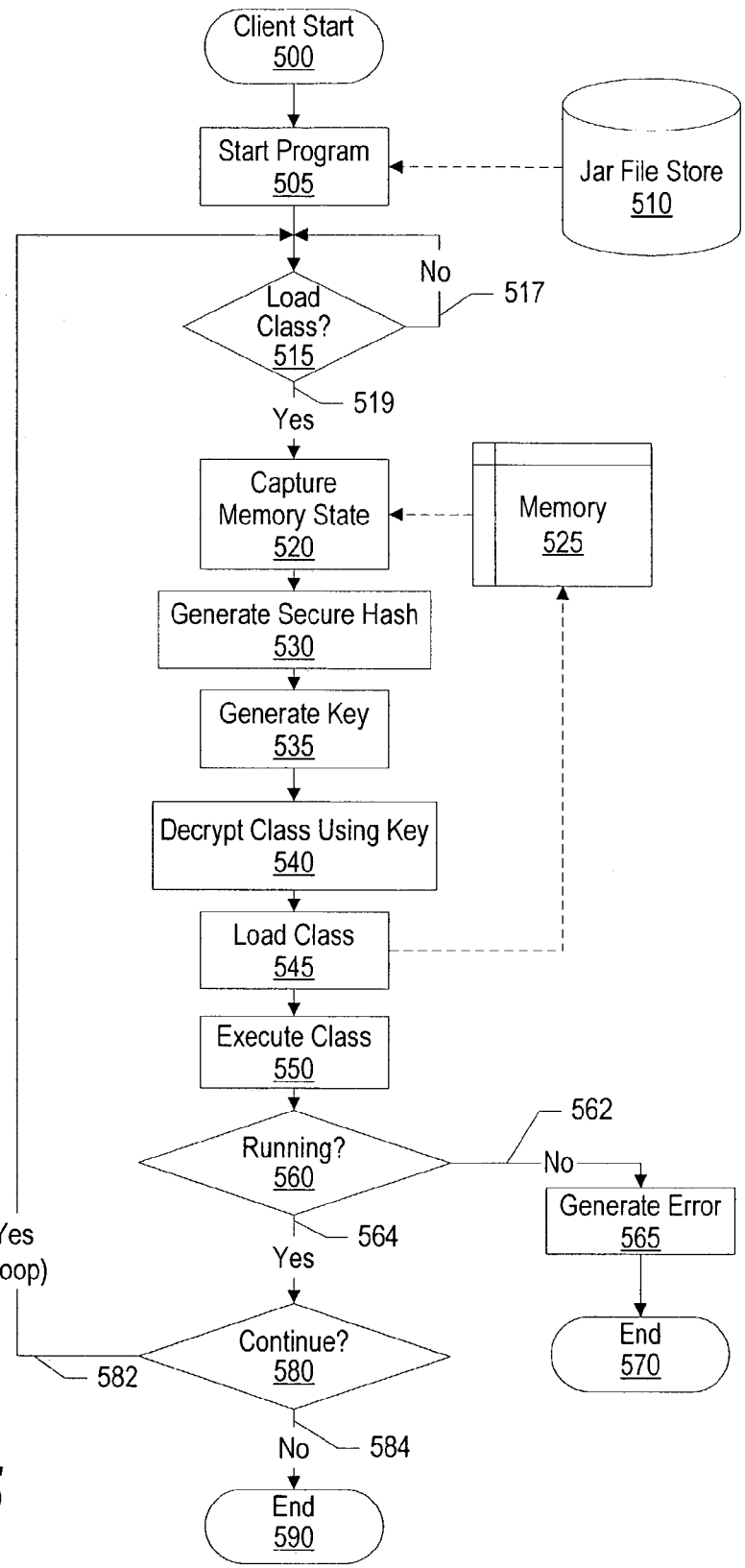
FIG. 5 is a flowchart showing steps taken in a client decrypting code segments included in a software program using keys that are generated from memory state snapshots.

When a client decrypts classes, the client decrypts a first class, executes the first class, and then decrypts a second class (see FIG. 5 and corresponding text for further details regarding program decryption). Therefore, in order for processing to encrypt the second class using a memory state corresponding with the client's decryption process, processing proceeds through a series of actions that place the memory in a state that corresponds with the first class being executed before capturing a second memory state snapshot (see actions corresponding to times t5 through t10 described below).

The series of actions start at time t5, whereupon action 330 restarts the software program which causes the memory state to revert back to initialize state 360. At time t6, action 332 calls the first class from the jar file which is currently encrypted, such as encrypt 1 312. At time t7, action 334 captures a memory state snapshot (e.g. initialize 360) and generates a first key using the first memory state snapshot. As discussed above, encrypt 1 312 was generated using a first key that was derived from the same memory state snapshot at action 324.

At time t8, action 336 retrieves encrypted 1 312 and loads it into internal memory, whereby changing the memory state to A encrypt 370. Processing determines that the class is encrypted, and action 338 decrypts the class at time t9 (see FIG. 4 and corresponding text for further details regarding class encryption determination). When processing decrypts the class at time t9, the memory state is changed to A decrypt 375. A time t10, action 340 executes the decrypted class, whereby changing the memory state to A execute 380. A execute 380 is the memory state required for capturing a second memory state snapshot for use in generating a key to encrypt a second class, such as class 2 308.

At time t11, the program calls a second class to load (e.g. action 342). At time t12, prior to loading class 2 308, action 344 captures a memory state snapshot (e.g. A execute 380) and generates a second key using the memory state snapshot. At time t13, action 346 retrieves class 2 308 and loads it into memory, which, in turn, changes the memory state from A execute 380 to B loaded 385.

A time t14, action 348 uses the generated second key and encrypts class 2 308. Action 348 also causes the memory state to change from B loaded 385 to B encrypted 390. Processing stores encrypt class 2 318 in the jar file. The jar file now includes two encrypted classes which are encrypt 1 308 and encrypt 2 318. Processing proceeds through the software program in this manner until each class is encrypted and stored in the jar file. Once each class is encrypted, the encrypted jar file is sent to a client computer for decrypting and execution.

Figure 4:
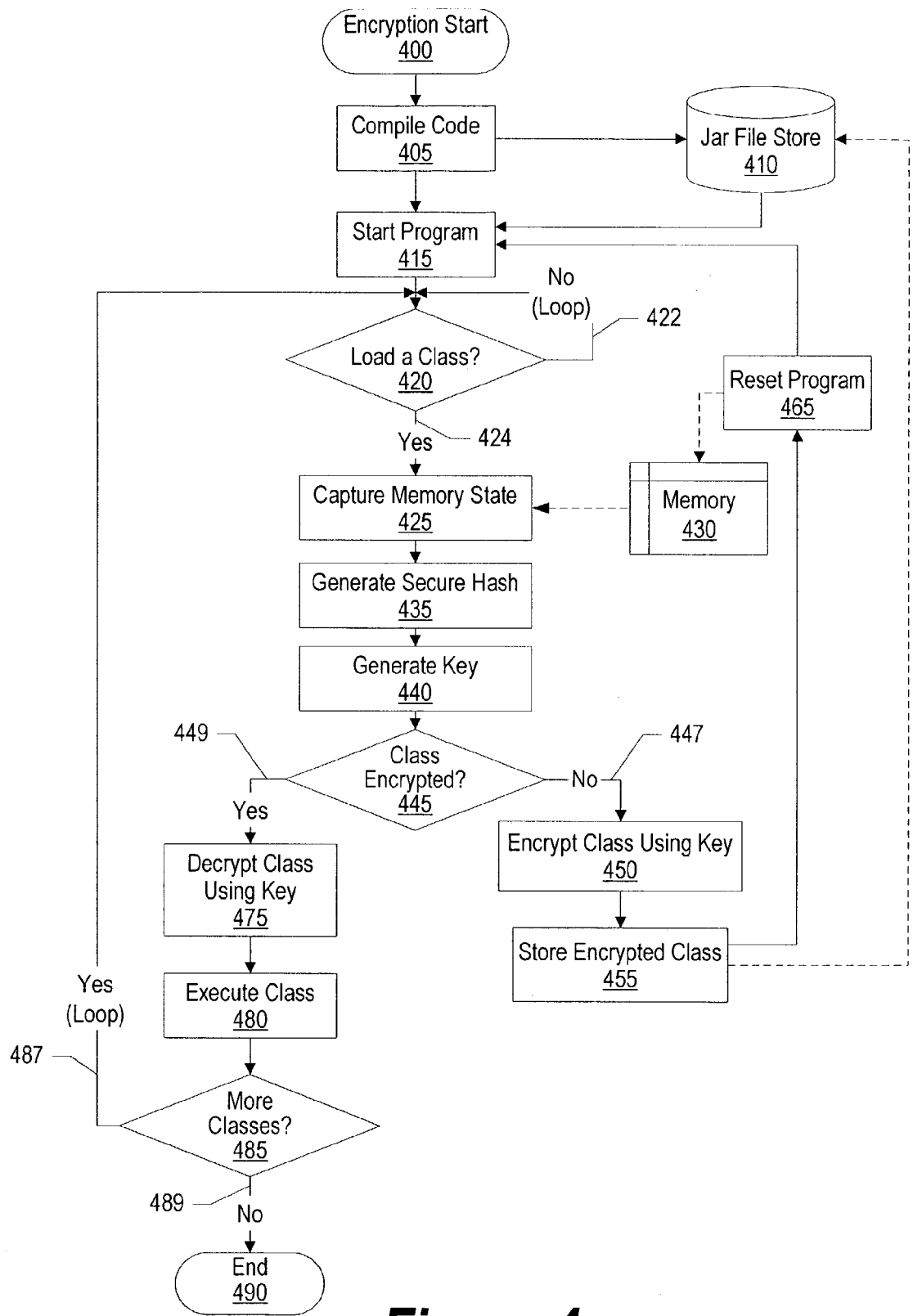
FIG. 4 is a flowchart showing steps taken in encrypting a software program using keys that are generated from memory state snapshots.

FIG. 4 is a flowchart showing steps taken in encrypting a software program using keys that are generated from memory state snapshots. Processing commences at 400, whereupon processing compiles the software program and stores the software program in jar file store 410. For example, a Java program may be compiled and stored in jar file store 410 using a "javac" command in conjunction with a Java jar command. Jar file store 410 may be stored on a non-volatile storage area, such as a computer hard drive.

Processing starts the compiled program at step 415, and a determination is made as to whether the program requests a class load (decision 420). For example, the program may request to load a class upon initialization. If the program has not requested to load a class, decision 420 branches to "No" branch 422 which loops back to monitor the program execution. This looping continues until the program requests to load a class, at which point decision 420 branches to "Yes" branch 424 whereupon processing captures a memory state snapshot of memory 430 at step 425. Memory 430 may be stored on a volatile storage device, such as internal memory, and corresponds with a particular Java Virtual Machine (JVM). As one skilled in the art can appreciate, memory state snapshots may be captured by saving threads and capturing the state of the memory when the threads are saved.

Processing generates a secure hash value using the memory state snapshot at step 435. For example, processing may use standard hash algorithms to generate a secure hash value, such as md5 or sha1. Processing uses the secure hash value to generate a key at step 440. In one embodiment, processing uses the secure hash value as the key. In another embodiment, processing may lengthen or shorten the secure hash value, such as with concatenation, which results in a suitable key length.

A determination is made as to whether the loading class is encrypted (decision 445). If the loading class is not encrypted, decision 445 branches to "No" branch 447 whereupon the loading class is encrypted using the generated key (step 450). For example, processing may use a symmetric exclusive-OR technique to encrypt the class. The encrypted class is stored in jar file store 410 and the original unencrypted class in removed from jar file store 410 at step 455. The encrypted class also resides in internal memory at this time (see FIG. 3 and corresponding text for further details regarding internal memory states).

Once the encrypted classes is stored in jar file store 410, processing resets (step 465) and restarts the program which, in turn, resets memory 430. When the program restarts, processing calls the first class which is now encrypted. Processing proceeds through steps 425 through 440 to re-generate the first key, whereupon a determination is made as to whether the loading class is encrypted (decision 445). Since the loading class is the encrypted first class, decision 445 branches to "Yes" branch 449 whereupon processing uses the generated first key to decrypt the encrypted first class (step 475). Processing executes the decrypted class at step 480. At this point, the memory state is in a condition to capture a second memory state snapshot for use in generating a second key to encrypt a second class.

A determination is made as to whether there are more classes to process (decision 485). If there are more classes to process, decision 485 branches to "Yes" branch 487 whereupon processing loops back to wait for another class to load. This looping continues until there are no more classes to process, at which point decision 485 branches to "No" branch 489 whereupon processing ends at 490.

FIG. 5 is a flowchart showing steps taken in a client decrypting code segments (e.g. classes) included in a software program using keys that are generated from memory state snapshots. The client received the encrypted software program and stored the encrypted software program in jar file store 510. Client processing commences at 500, whereupon processing starts the encrypted software program at step 505. A determination is made as to whether program requests to load a class (decision 515). If the program does not request to load a class, decision 515 branches to "No" branch 517 which loops back to monitor the program's requests. This looping continues until the program requests to load a class, at which point decision 515 branches to "Yes" branch 519. Processing captures a memory state snapshot of memory 525 at step 520. Memory 525 may be stored on a volatile storage area, such as internal memory, and corresponds with a particular Java virtual machine.

Processing generates a secure hash value using the memory state snapshot at step 530. The technique to generate the secure hash value corresponds with the technique used generate a secure hash value that was used in generating a key to encrypt the loading class, such as md5 or sha1 (see FIG. 4 and corresponding text for further details regarding code segment encryption). Processing uses the secure hash value to generate a key at step 535. The client uses a key generation technique corresponding to the key generation technique used at a vendor's location during the code segment encryption process.

Processing decrypts the encrypted code segment at step 540 whereby the class decrypts properly if the memory state snapshot at the client is the same as the memory state snapshot that the vendor used to encrypt the class and if the client has not altered the class. The class is loaded into memory 525 at step 545, and processing executes the class at step 550. A determination is made as to whether the class is loaded and is running correctly (step 560). For example, if the client's memory state snapshot is different from the vendor's memory state snapshot due to the client loading the class out of order, the generated key is incorrect and the decrypted class will not function properly. If the class did not load or is not running correctly, decision 560 branches to "No" branch 562 whereupon processing generates an error at step 565, and processing ends at 570.

On the other hand, if the class loaded and is running correctly, decision 560 branches to "Yes" branch 564 whereupon a determination is made as to whether to continue the program (i.e. load more classes). If processing should continue the program, decision 580 branches to "Yes" branch 582 whereupon processing loops back to continue the program. This looping continues until the program terminates, at which point decision 580 branches to "No" branch 584 whereupon processing ends at 590.

Figure 6:
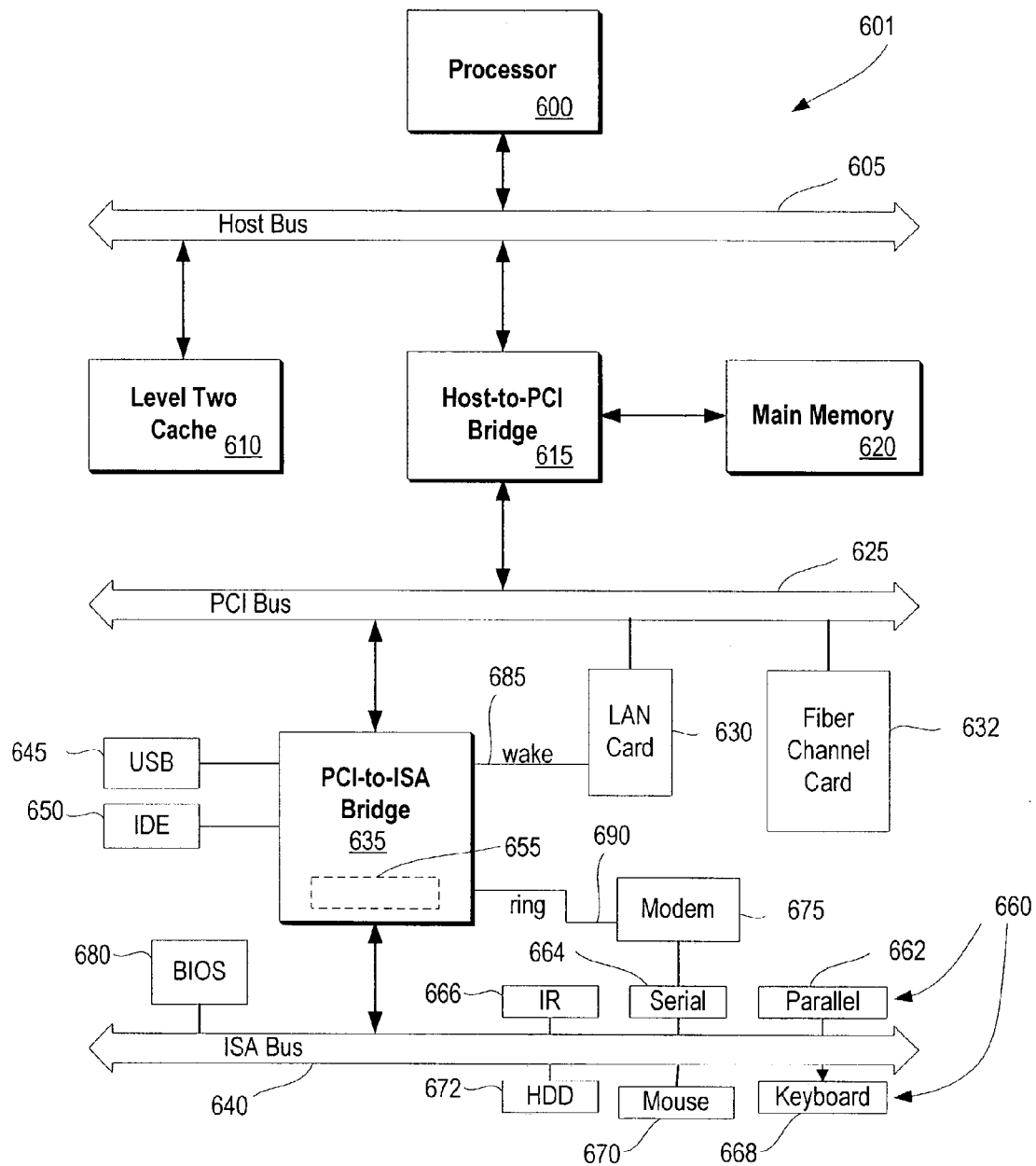
FIG. 6 is a block diagram of an information handling system capable of implementing the present invention.

FIG. 6 illustrates information handling system 601 which is a simplified example of a computer system capable of performing the invention described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI bus 625 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of securing code, said method comprising:
   receiving a first request, wherein the first request corresponds to a first code segment selected from a plurality of code segments;
   capturing a first snapshot in response to receiving the first request, the first snapshot corresponding to the state of a first computer system;
   generating a first key using the first snapshot;
   encrypting the first code segment using the generated first key, the encrypting resulting in an encrypted first code segment;
   capturing a second snapshot, the second snapshot corresponding to the state of the first computer system;
   re-generating the first key using the second snapshot;
   decrypting the encrypted first code segment using the re-generated first key;
   executing the decrypted first code segment in response to the decrypting;
   receiving a second request in response to the executing, wherein the second request corresponds to a second code segment selected from the plurality of code segments;
   capturing a third snapshot in response to receiving the second request, the third snapshot corresponding to the state of the first computer system;
   generating a second key using the third snapshot; and
   encrypting the second code segment using the generated second key, the encrypting resulting in an encrypted second code segment.

2. The method as described in claim 1 wherein the first snapshot is a memory state snapshot that corresponds to a memory area included in the first computer system.

3. The method as described in claim 1 further comprising:
   including the encrypted first code segment in a file; and
   sending the file to a second computer system, the file adapted to generate a client key at the second computer system and decrypt the encrypted first code segment using the generated client key, and also adapted to execute the decrypted first code segment.

4. The method as described in claim 3 wherein the file corresponds to a file type, the file type selected from the group consisting of a jar file, a zip file, a bzip file, a gzip file, and a tar file.

5. The method as described in claim 1 wherein the generating further comprises:
   creating a hash value using the captured first snapshot; and
   using the created hash value in the generating.

6. The method as described in claim 1 wherein the first key is not distributed to a second computer system for use in decrypting the encrypted first code segment.

7. An information handling system comprising:
   one or more processors;
   a memory accessible by the processors;
   one or more nonvolatile storage devices accessible by the processors; and
   a set of instructions stored in the memory, wherein one or more of the processors executes the set of instructions in order to perform actions of:
      receiving a first request, wherein the first request corresponds to a first code segment selected from a plurality of code segments;
      capturing a first snapshot in response to receiving the first request, the first snapshot corresponding to the state of the memory;
      generating a first key using the first snapshot;
      encrypting the first code segment using the generated first key, the encrypting resulting in an encrypted first code segment;
      capturing a second snapshot, the second snapshot corresponding to the state of the first computer system;
      re-generating the first key using the second snapshot;
      decrypting the encrypted first code segment using the re-generated first key;
      executing the decrypted first code segment in response to the decrypting;
      receiving a second request in response to the executing, wherein the second request corresponds to a second code segment selected from the plurality of code segments;
      capturing a third snapshot in response to receiving the second request, the third snapshot corresponding to the state of the first computer system;

generating a second key using the third snapshot; and
encrypting the second code segment using the generated second key, the encrypting resulting in an encrypted second code segment.

8. The information handling system as described in claim 7 further comprising an additional set of instructions in order to perform actions of:
including the encrypted first code segment in a file; and
sending the file to a second computer system over a computer network, the file adapted to generate a client key at the second computer system and decrypt the encrypted first code segment using the generated client key, and also adapted to execute the decrypted first code segment.

9. The information handling system as described in claim 8 wherein the file corresponds to a file type, the file type selected from the group consisting of a jar file, a zip file, a bzip file, a gzip file, and a tar file.

10. The information handling system as described in claim 7 further comprising an additional set of instructions in order to perform actions of:
creating a hash value using the captured first snapshot; and
using the created hash value in the generating.

11. The information handling system as described in claim 7 wherein the first key is not distributed to a second computer system for use in decrypting the encrypted first code segment.

12. A computer program product stored on a computer operable media, the computer operable media contain instructions for execution by a computer, which, when executed by the computer, cause the computer to implement a method of securing code, the method comprising:
receiving a first request, wherein the first request corresponds to a first code segment selected from a plurality of code segments;
capturing a first snapshot in response to receiving the first request, the first snapshot corresponding to the state of a first computer system;
generating a first key using the first snapshot;
encrypting the first code segment using the generated first key, the encrypting resulting in an encrypted first code segment;
capturing a second snapshot, the second snapshot corresponding to the state of the first computer system;
re-generating the first key using the second snapshot;
decrypting the encrypted first code segment using the re-generated first key;
executing the decrypted first code segment in response to the decrypting;
receiving a second request in response to the executing, wherein the second request corresponds to a second code segment selected from the plurality of code segments;
capturing a third snapshot in response to receiving the second request, the third snapshot corresponding to the state of the first computer system;
generating a second key using the third snapshot; and
encrypting the second code segment using the generated second key, the encrypting resulting in an encrypted second code segment.

13. The computer program product as described in claim 12 wherein the first snapshot is a memory state snapshot that corresponds to a memory area included in the first computer system.

14. The computer program product as described in claim 12 wherein the method further comprises:
including the encrypted first code segment in a file; and
sending the file to a second computer system, the file adapted to generate a client key at the second computer system and decrypt the encrypted first code segment using the generated client key, and also adapted to execute the decrypted first code segment.

15. The computer program product as described in claim 14 wherein the file corresponds to a file type, the file type selected from the group consisting of a jar file, a zip file, a bzip file, a gzip file, and a tar file.

16. The computer program product as described in claim 12 wherein the method further comprises:
creating a hash value using the captured first snapshot; and
using the created hash value in the generating.

17. The computer program product as described in claim 12 wherein the first key is not distributed to a second computer system for use in decrypting the encrypted first code segment.

* * * * *